United States Patent [19]

Knoors

[11] Patent Number: 5,217,257
[45] Date of Patent: Jun. 8, 1993

[54] MAP

[76] Inventor: Gidy H. C. G. Knoors, Generaal Bothastraat 29, 5642 NJ Eindhoven, Netherlands

[21] Appl. No.: 829,351

[22] Filed: Jan. 31, 1992

[30] Foreign Application Priority Data

Feb. 5, 1991 [NL] Netherlands .......................... 9100197

[51] Int. Cl.$^5$ ............................................. G09B 29/00
[52] U.S. Cl. ...................................... 283/34; 493/162; 40/904; 434/150
[58] Field of Search ....................... 281/5; 283/34, 35; 493/162; 40/904; 434/150

[56] References Cited

U.S. PATENT DOCUMENTS

| | | | |
|---|---|---|---|
| 4,826,212 | 5/1989 | Muth et al. | 283/34 |
| 4,856,818 | 8/1989 | Rabenecker et al. | 283/34 |
| 4,917,405 | 4/1990 | Muth et al. | 283/34 X |

FOREIGN PATENT DOCUMENTS 2471638 6/1981 France .

Primary Examiner—Mark Rosenbaum
Assistant Examiner—Willmon Fridie, Jr.
Attorney, Agent, or Firm—Ladas & Parry

[57] ABSTRACT

The invention relates to a map on which informative data are printed, said map being provided with folding lines and with map portions located between said folding lines. A central folding line is provided, whereby two further folding lines, extending on either side of the central folding line in the unfolded condition of the map, adjoin said central folding line in each of a plurality of spaced joining points, and whereby further folding lines, which extend from an adjoining point on the central folding line, include a 90° angle with each other and similar angles with the central folding line. The map is folded alternately about the further folding lines in opposite directions, all this in such a manner that in the folded-up condition of the map all parts located between said folding lines lie one on top of the other.

4 Claims, 2 Drawing Sheets

MAP

The invention relates to a map on which informative data are printed, said map being provided with folding lines and with map portions located between said folding lines.

Such maps may e.g. be used as maps covering a country, as street plans or as ground plans of buildings, exhibition grounds etc.

The usual maps generally have a comparatively complicated folding system, usually both hands being required to unfold and hold the map.

The object of the invention is to obtain a map which is suitable for the above purposes and which can be simply handled using one hand; said map will therefore be particularly suited for use as a ground plan of exhibitions, factory sites, buildings or the like.

According to the invention the above objective can be achieved in that a central folding line is provided, whereby two further folding lines, extending on either side of the central folding line in the unfolded condition of the map, adjoin said central folding line in each of a plurality of spaced joining points, and whereby further folding lines, which extend from an adjoining point on the central folding line, include a 90° angle with each other and similar angles with the central folding line, whilst the folding lines located on the one side of the central folding line as well as the folding lines located on the other side of the folding line extend parallel to each other and the map parts adjoining two further abutting folding lines are folded about said further folding lines in a first direction, and map parts adjoining an adjacent pair of further abutting folding lines are folded in an opposite direction, and the map parts which adjoin a part of the central folding line which is located between two joining points with respect to the part of the central folding line in question are folded in a direction opposite the folding direction of the map parts that adjoin an adjacent part of the central folding line located between two joining points, all this in such a manner that when the map is folded up all map parts located between the folding lines lie one on top of the other.

When using a map according to the invention the map can be taken hold of near one end of the diagonal folding line and be opened, using one hand.

The invention will be explained in more detail hereafter with reference to an embodiment of a map according to the invention diagrammatically illustrated in the accompanying Figures.

Figure 1:
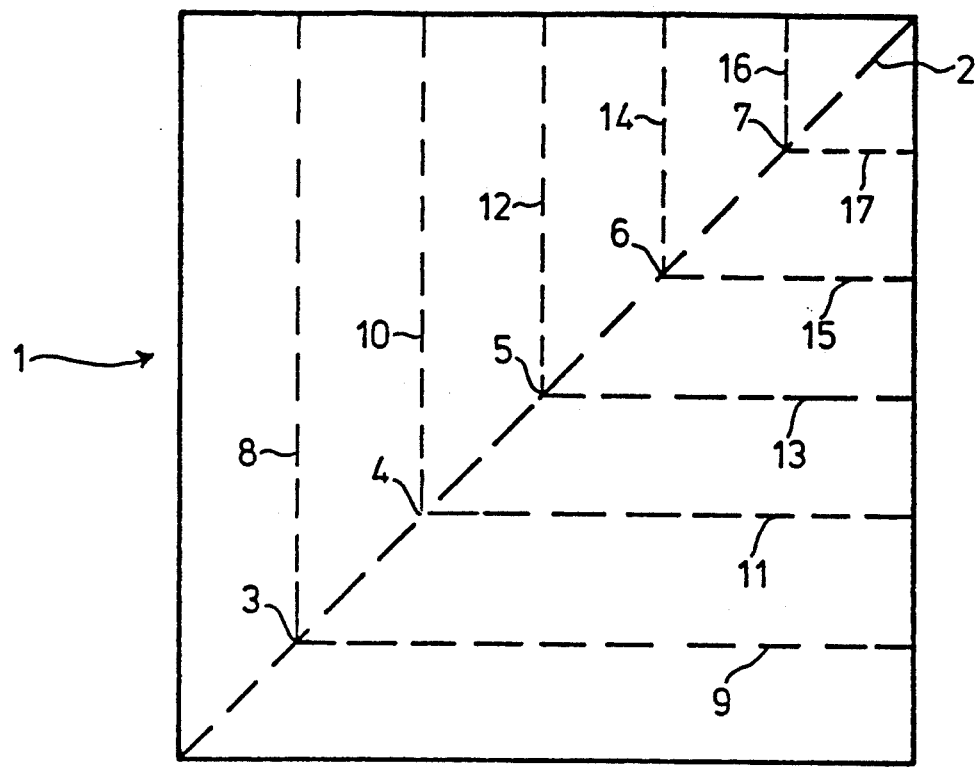
FIG. 1 is a plan view of a map according to the invention in unfolded condition.
Figure 2:
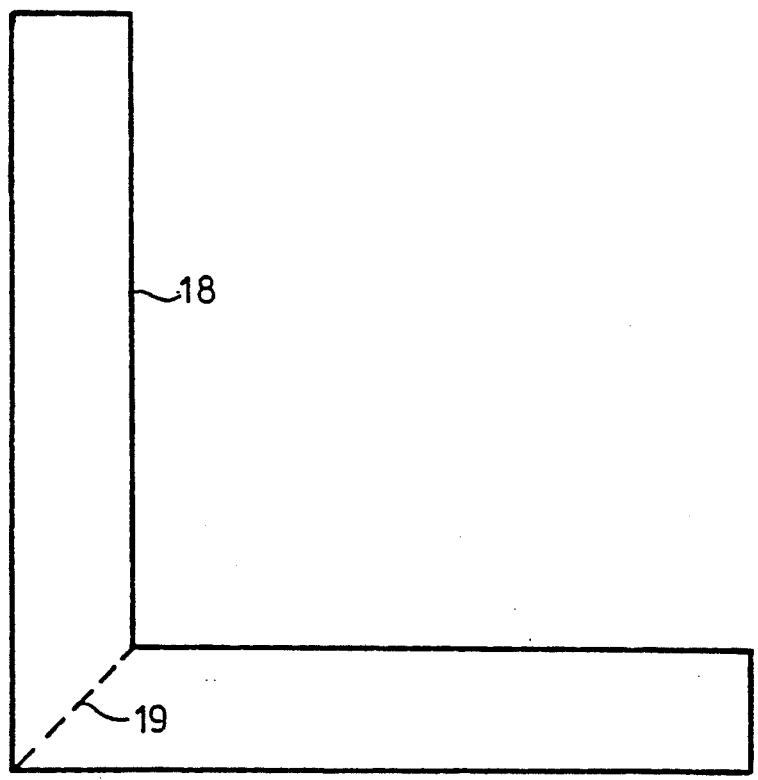
FIG. 2 is a plan view of a strengthening rib, which may be provided on the map.

In the embodiment shown in FIG. 1 the map 1 is a square sheet. In said sheet a central folding line 2 is provided, said central folding line in the illustrated embodiment extending between two diagonally opposed corner points.

Two folding lines 8, 9; 10, 11; 12, 13; 14, 15 and 16, 17 respectively, extending perpendicularly to each other, adjoin said central folding line in each of a plurality of joining points 3–7.

Figure 3:
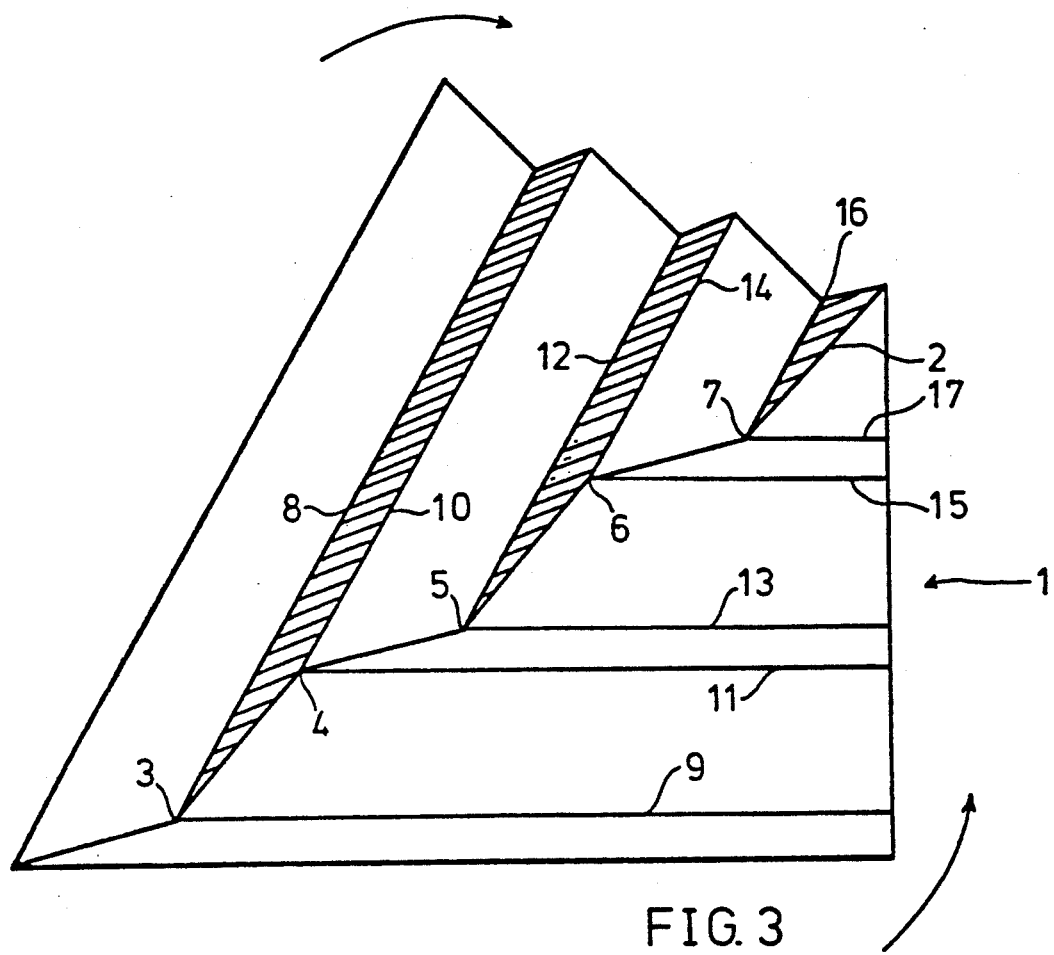
FIG. 3 is a perspective plan view of the map in partly foldedup condition.

As will be apparent, in particular from the perspective plan view of the partly folded-up map shown in FIG. 3, the map parts located on either side of the abutting folding lines 8 and 9 are bent upwards with respect to the folding lines 8 and 9 in question, when seen in FIG. 3. In a similar manner the map parts adjoining the adjacent folding lines 10 and 11 are folded downwards in opposite direction with respect to the folding lines 10 and 11 in question. The map parts adjoining the folding lines 12 and 13 are folded upwards with rspect to said folding lines 12 and 13, when seen in FIG. 3, whilst the map parts adjoining the adjacent folding lines 14 and 15 are folded downwards again with respect to said folding lines 14 and 15. The map parts adjoining the folding lines 16 and 17 are folded upwards again with respect to said folding lines 16 and 17, when seen in FIG. 3.

Furthermore it will be apparent from FIG. 3 that in a similar manner, when seen in FIG. 3, the map parts which adjoin the part of the central folding line 2 located between the joining points 3 and 4, are folded in a direction which is opposed to the direction in which the map parts adjoining the part of the central folding line 2 located between the joining points 4 and 5 are folded with respect to said folding line 2.

Figure 4:
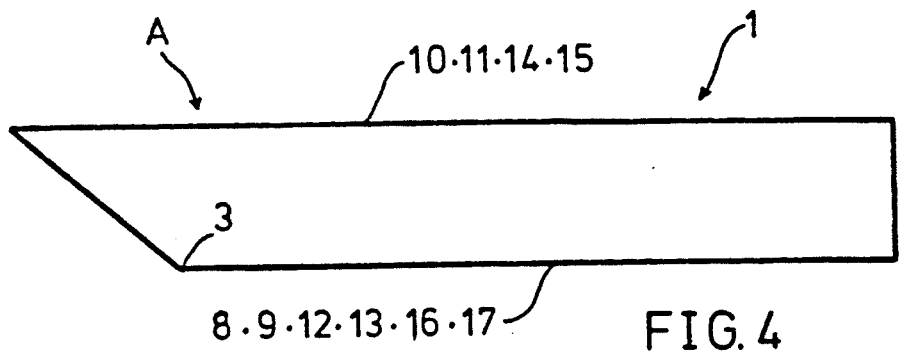
FIG. 4 is an elevation view of the map in completely folded-up condition.

When folding the map about the folding lines the map parts located on either side of the folding line 9 will thus abut against one another, just like the map parts located on either side of the folding line 11, the folding line 13, the folding line 15 and the folding line 17 will abut against one another. The map parts located on either side of the folding line 8 will simultaneously abut against one another when the map is folded up, just like the map parts located on either side of the folding line 10, the folding line 12, the folding line 14 and the folding line 16. In the folded-up condition all parts located on either side of the folding lines will lie one on top of the other in the shape of flat elongated strips, as is shown in FIG. 4. When the map is to be unfolded it can be taken hold of by the left-hand side, when seen in FIG. 4, in such a manner that the index finger and the middle finger support the outermost map parts at the outside, whilst the thumb can be pressed between the outermost map parts, in the direction of the joining point 3, as is indicated by means of the arrow A in FIG. 4. The map will automatically unfold thereby.

In order to strengthen the map an L-shape strengthening rib may be glued to the outside of the outermost map parts, i.e. to the map part located on the left of the folding line 8 and under the folding line 9, when seen in FIG. 1, said strengthening rib near its corner point being provided with a folding line 19 which, if the strengthening rib 18 is glued to the map, will coincide with the end of the central folding line 2 located on the left, when seen in FIG. 1. Such a strengthening rib will stiffen the outermost map parts, which will facilitate the handling, in particular the opening and the folding-up of the map.

I claim:

1. A foldable sheet for use as a map, the sheet comprising:
   a central folding line;
   a plurality of pairs of further folding lines, each pair having a first folding line on one side of the central folding line and a second folding line on the other side of the central folding line, the first and second folding lines and central folding lines meeting at a joining point, the first and second folding lines of the pair of folding lines being at substantially 90 degrees to each other and each defining a similar angle with the central folding line, the first folding line of each pair of further folding lines being substantially parallel to the first folding line of the other pairs of further folding lines and the second folding line of a pair being substantially parallel with the other second folding lines of the further folding lines, the sheet being foldable whereby alternate pairs of further folding lines fold in a first direction with each pair of further folding lines there between folding in an opposite direction, the central folding line being folded in opposite directions between alternating joining points, whereby the sheet is movable between a folded and unfolded condition.

2. A sheet as claimed in claim 1 wherein the joining points are equispaced from each other.

3. A sheet as claimed in claim 1 wherein the sheet is substantially square and the central folding line extends diagonally from one corner of the sheet to another corner thereof.

4. A sheet as claimed in claim 1 further comprising a strengthening rib along two adjacent edges of the sheet.

* * * * *